United States Patent
Tiger et al.

(10) Patent No.: US 9,491,223 B2
(45) Date of Patent: Nov. 8, 2016

(54) TECHNIQUES FOR DETERMINING A MOBILE APPLICATION DOWNLOAD ATTRIBUTION

(71) Applicant: ONAVO MOBILE LTD., Ramat Gan (IL)

(72) Inventors: Roi Tiger, Tel Aviv (IL); Nimrod Priell, Tel Aviv (IL); Eran Fridman, Zofit (IL); Gadi Eliashiv, Tel Aviv (IL); Lior Tubi, Rishon Lezion (IL)

(73) Assignee: ONAVO MOBILE LTD., Ramat Gan (IL)

( * ) Notice: Subject to any disclaimer, the term of this patent is extended or adjusted under 35 U.S.C. 154(b) by 250 days.

(21) Appl. No.: 13/944,508

(22) Filed: Jul. 17, 2013

(65) Prior Publication Data
US 2014/0237109 A1    Aug. 21, 2014

Related U.S. Application Data

(60) Provisional application No. 61/765,746, filed on Feb. 17, 2013.

(51) Int. Cl.
*G06F 15/173* (2006.01)
*H04L 29/08* (2006.01)
*G06Q 30/02* (2012.01)
*H04L 29/06* (2006.01)

(52) U.S. Cl.
CPC ............. *H04L 67/025* (2013.01); *G06Q 30/02* (2013.01); *H04L 63/08* (2013.01)

(58) Field of Classification Search
CPC ................ H04L 63/08; H04L 67/025; A01K 2227/105; C12N 15/8247; C12N 15/8279; C12N 15/8286; G06Q 30/02
USPC .......... 726/4, 22, 24, 25; 709/217, 228, 224; 455/455, 419
See application file for complete search history.

(56) References Cited

U.S. PATENT DOCUMENTS

| | | | |
|---|---|---|---|
| 7,177,270 B2 | 2/2007 | Sim et al. | |
| 7,269,596 B2 * | 9/2007 | Williams et al. | |
| 7,401,065 B2 | 7/2008 | Watanabe et al. | |
| 7,613,692 B2 * | 11/2009 | Hamilton et al. | |
| 7,720,836 B2 * | 5/2010 | Abajian et al. | 707/711 |
| 7,945,693 B2 * | 5/2011 | Farber et al. | 709/234 |
| 7,996,882 B2 | 8/2011 | L'Heureux et al. | |
| 8,032,409 B1 * | 10/2011 | Mikurak | 705/14.39 |
| 8,166,010 B2 | 4/2012 | Ives | |
| 8,549,166 B2 * | 10/2013 | Oliver | G06F 8/60 709/225 |
| 8,577,957 B2 * | 11/2013 | Behar et al. | 709/203 |
| 9,055,122 B2 * | 6/2015 | Grecco et al. | |
| 2003/0028896 A1 * | 2/2003 | Swart et al. | 725/127 |
| 2004/0230670 A1 * | 11/2004 | Schmidt-Karaca | H04L 41/0816 709/220 |

(Continued)

*Primary Examiner* — Dhairya A Patel (57) ABSTRACT

A proxy server and a method for determining a mobile application download attribution are provided. The method includes identifying an application downloaded from an application repository to a mobile device; analyzing previously logged requests sent from the mobile device to identify a most recent request directed to the application repository from the mobile device; analyzing the identified most recent request to detect a source that causes the application download and at least one identifier of the application; determining the download attribution respective of the source that causes the application download; and generating an application metadata respective of the download attribution and the application identifiers. This is subject to a user's privacy, opt-in, or opt-out settings.

18 Claims, 5 Drawing Sheets

(56) References Cited

U.S. PATENT DOCUMENTS

| | | | |
|---|---|---|---|
| 2006/0190527 A1* | 8/2006 | Neil | G06F 9/542 709/203 |
| 2009/0287648 A1 | 11/2009 | Yacobi | |
| 2010/0161720 A1* | 6/2010 | Colligan et al. | 709/203 |
| 2011/0145920 A1* | 6/2011 | Mahaffey et al. | 726/22 |
| 2011/0302623 A1 | 12/2011 | Ricci | |
| 2012/0011567 A1* | 1/2012 | Cronk et al. | 726/4 |
| 2012/0081207 A1* | 4/2012 | Toprani | G06F 9/445 340/4.3 |
| 2012/0240236 A1* | 9/2012 | Wyatt et al. | 726/25 |
| 2012/0265595 A1 | 10/2012 | Corner et al. | |
| 2012/0265599 A1 | 10/2012 | Corner et al. | |
| 2012/0265602 A1* | 10/2012 | Corner et al. | 705/14.39 |
| 2012/0265603 A1 | 10/2012 | Corner et al. | |
| 2012/0265604 A1 | 10/2012 | Corner et al. | |

* cited by examiner

TECHNIQUES FOR DETERMINING A MOBILE APPLICATION DOWNLOAD ATTRIBUTION

CROSS REFERENCE TO RELATED APPLICATIONS

This application claims the benefit of U.S. Provisional Application No. 61/765,746 filed on Feb. 17, 2013, the contents of which are herein incorporated by reference.

TECHNICAL FIELD

The invention generally relates to mobile applications, and more specifically to techniques for attributing a cause of an application download.

BACKGROUND

Hundreds of thousands of mobile applications (or "Apps") are currently available in web sources (repositories), such as the AppStore®, Google Play® and the like. Through such web sources, several discovery tools exist to assist a user seeking to download a mobile application. Such tools maybe a constructed search bar, a categorized menu or classifiers. The classifiers may be, for example, most popular, newest, paid, free, and so on.

Developers, distributors, and/or owners of applications are interested in measuring and tracking their mobile applications' attribution. Typically, attribution is the measurement of user events as a result of marketing activity. An event can be a download of an application, an installation of an application, repeating an application launch, an in-application purchase, and so on. With regard to download attribution there is an interest in identifying the path (or source) which led to the download of a particular application and applications similar to a given application for example, an application of a certain developer as well as competitors' applications.

Every mobile application marketer or developer seeks to measure the effectiveness of their applications. However, the download attribution is a unique problem for mobile applications as there is no standard tracking methodology. In addition, web repositories for downloading applications are sometimes encrypted, which makes it difficult to identify the application download attribution.

It would be therefore advantageous to provide an efficient solution for identifying a mobile application download attribution.

As is well-known in the art, users may be given the option within privacy settings, or otherwise, to opt-in or opt-out of various features, such as the collection of browsing information, location information, or other information about a mobile device. For instance, during a configuration process, a user may be asked to specifically opt-in to the identification and collection of information relating to their mobile device. Similarly, the user may be required to specifically opt-in before information about their device is transmitted from the device to a remote server. Alternatively, a user may be provided an opportunity to opt-out of the identification and collection of information relating their device, or the transmission of information about their device to a remote server.

SUMMARY

Certain embodiments disclosed herein include a method and a proxy server for determining a mobile application download attribution. The method comprises identifying an application downloaded from an application repository to a mobile device; analyzing previously logged requests sent from the mobile device to identify a most recent request directed to the application repository from the mobile device; analyzing the identified most recent request to detect a source that causes the application download and at least one identifier of the application; determining the download attribution respective of the source that causes the application download; and generating an application metadata respective of the download attribution and the application identifiers. These actions may be subject to a user's privacy, opt-in, or opt-out settings.

Certain embodiments disclosed herein include a method for determining a mobile application download attribution subject to a user's privacy, opt-in, or opt-out settings. The method comprises identifying a download of an application from an application repository of a mobile device, wherein communication between the application repository and the mobile device is by means of an encrypted protocol; retrieving previously logged requests sent from the mobile device; analyzing the retrieved requests to identify a most recent request directed to the application repository from the mobile device; analyzing the most recent request to determine at least an application identifier embedded in the request; downloading to a proxy server the application using the application identifier; causing installation of the downloaded application in the proxy server; gathering information about the downloaded information through the installation process, wherein the gathered information includes at least information characterizing the downloaded application; and determining a source attributed to the download of the application to the mobile device based in part on a plurality of explicit search terms identified in the previously logged requests. These actions may be subject to a user's privacy, opt-in, or opt-out settings.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to certain embodiments, techniques for determining a mobile application download attribution are disclosed. The techniques are carried out by a proxy server deployed between mobile devices and one or more central repositories for mobile applications. In one embodiment, the proxy server is configured to identify a source that triggers or causes the download of an application to a user device when the connection with the central repository is encrypted. According to another embodiment, the proxy server is configured to determine the download attribution when the connection with the central repository is unencrypted.

In both embodiments, the download attribution may include the source from which the download was initiated or measurement of the user events that resulted in downloading the application. Such sources may be, for example, a search query entered by a user of a mobile device, an advertisement of an application, and search and selection of the application in the central repository. For each identified download, a metadata is generated to include information related to at least the name, identifier, type of the downloaded application, search queries used for searching the application, the source that initiated the download, a name of the repository from which the application was downloaded, a URL of the repository, a developer name, a developer web site, and so on.

In one embodiment, statistics and actionable metrics are computed based on the determined attribution. This provides insight on the way the applications were downloaded. These statistics and actionable metrics include, for example, the popularity of a certain application versus other applications in the same category, the popularity of a certain source versus other sources, a number of downloads that resulted from a source (a certain advertisement), and so on. The actionable metrics provide information about, for example, how much a marketing of an application was successful, how numbers of downloads can be maximized, and so on.

Figure 1:
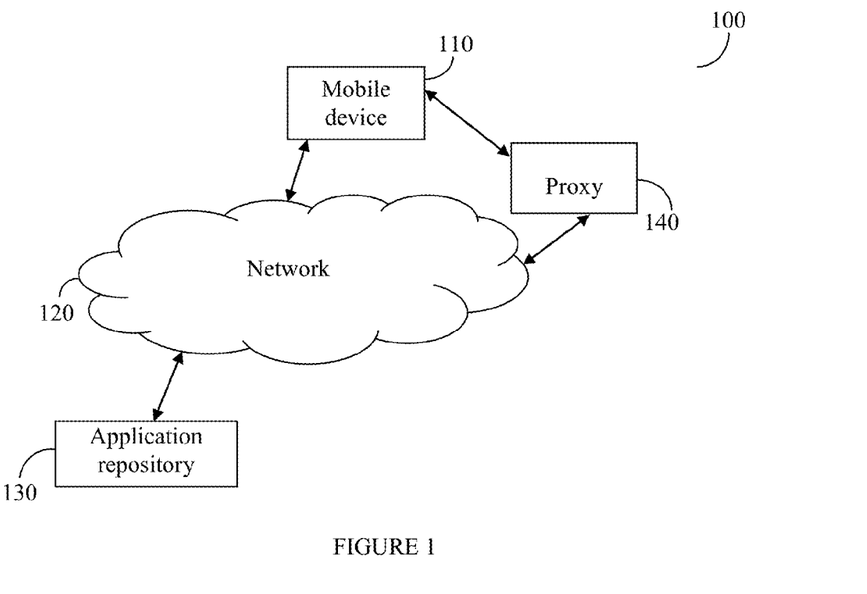
FIG. 1 is a schematic diagram of a network system utilized to describe various embodiments disclosed herein.

It should be noted that the disclosed techniques would provide accurate download attribution as they are designed to identify the attribution even when some information in a web source of applications may be hidden. FIG. 1 depicts an exemplary and non-limiting schematic diagram of a network system 100 utilized to describe various embodiments disclosed herein. A mobile device 110, which may be a smart phone, a mobile phone, a tablet computer, and the like, is communicatively connected to a network 120. The network 120 may be, for example, a local area network (LAN), a wide area network (WAN), a metro area network (MAN), the Internet, the worldwide web (WWW), a wireless network, a wired network, a cellular network, the like, and any combinations thereof.

Also connected to the network 120 is an application repository 130. The repository 130 is a web source that hosts a plurality of mobile applications available for download to the mobile device 110. Typically, mobile applications hosted in the application repository 130 are classified per different attributes, as discussed above. Examples for the application repository 130 may include, for example but not limited to, AppStore® by Apple®, Google®Play, Amazon® Appstore, Microsoft® Appstore, and the like. The communication between the mobile device 110 may be over a hypertext transfer protocol (HTTP), HTTP secure (HTTPS) protocol, or by means of other encrypted or unencrypted protocols.

Also connected to the network 120 is a proxy server 140. According to one embodiment, all communication between the mobile device 110 and the application repository 130 in order to download an application is relayed through the proxy server 140. As previously discussed within the Background, functionality may be subject to well-known opt-in or opt-out settings, or other privacy settings commonly used within the art. For instance, a user may be required to opt-in or provided the opportunity to opt-out prior to any communication being relayed through the proxy server 140.

In one embodiment, the mobile device 110 is configured by the network carrier to direct all requests addressed to the application repository 130 through the proxy server 140. Such configuration may be performed during activation of the mobile device 110 or when the device is connected to a data network of the network carrier. It should be noted that only one mobile device 110, one application repository 120, and one proxy server 140 are illustrated merely for the sake of simplicity of the description.

In one embodiment, the application repository 130 receives a request from the mobile device 110 to download an application. The proxy server 140 identifies the request and generates metadata respective of the requested application, subject to a user's privacy, opt-in, or opt-out settings. The metadata may include, for example, information related to at least a name, a unique identifier, and/or type of the downloaded application, search queries used for searching the application, the source that initiated the download, a name of the repository from which the application was downloaded, a URL of the repository, a developer name, a developer web site, and so on. The unique identifier is an injective identifier of the application within the application repository 130. As previously discussed within the Background, functionality may be subject to well-known opt-in or opt-out settings, or other privacy settings commonly used within the art. For instance, a user may be required to opt-in or provided the opportunity to opt-out prior to any metadata being collected or analyzed.

According to one embodiment, in order to determine the application download attribution for downloads initiated through search queries, the proxy server 140 is configured to identify one or more search queries (or key words) received both by the application repository 130 and the respected auto-suggested queries received by the mobile device 110. The proxy server 140 is further configured to analyze the search results received respective of the one or more search queries when determining the download attribution, subject to a user's privacy, opt-in, or opt-out settings.

According to another embodiment, when the request to download an application is originated at a web advertisement source or a landing page, the proxy server 140 is configured to identify the source through which the request was redirected. Typically, a request for downloading an application through a web advertisement source is accompanied by a corresponding URL directed to a location in the application repository 130 through which the application can be downloaded. The request is initiated as the user taps or clicks on an advertisement displayed on the mobile device 110. The request is received at the application repository 130 and the proxy server 140.

The request is a HTTP request including in part the URL pointing to a specific location in the application repository 130 and a 'HTTP Referer' value (designated in an HTTP header field) that identifies the address (URL) of the web page (or web advertisement) that is linked to the application being requested. The proxy 140 analyzes the HTTP Referer value to determine that the attribution resulted from an advertisement or a landing page. The proxy 140 can also identify advertisement's identifiers, which typically include geographical regions, publisher name, servicing company name, and so on.

It should be noted that in order to download an application to the mobile device 110, in certain implementations of current application repositories, a request is sent from the application repository 130 to an external URL that contains the files required in order to execute the application on the mobile device 110.

Figure 2:
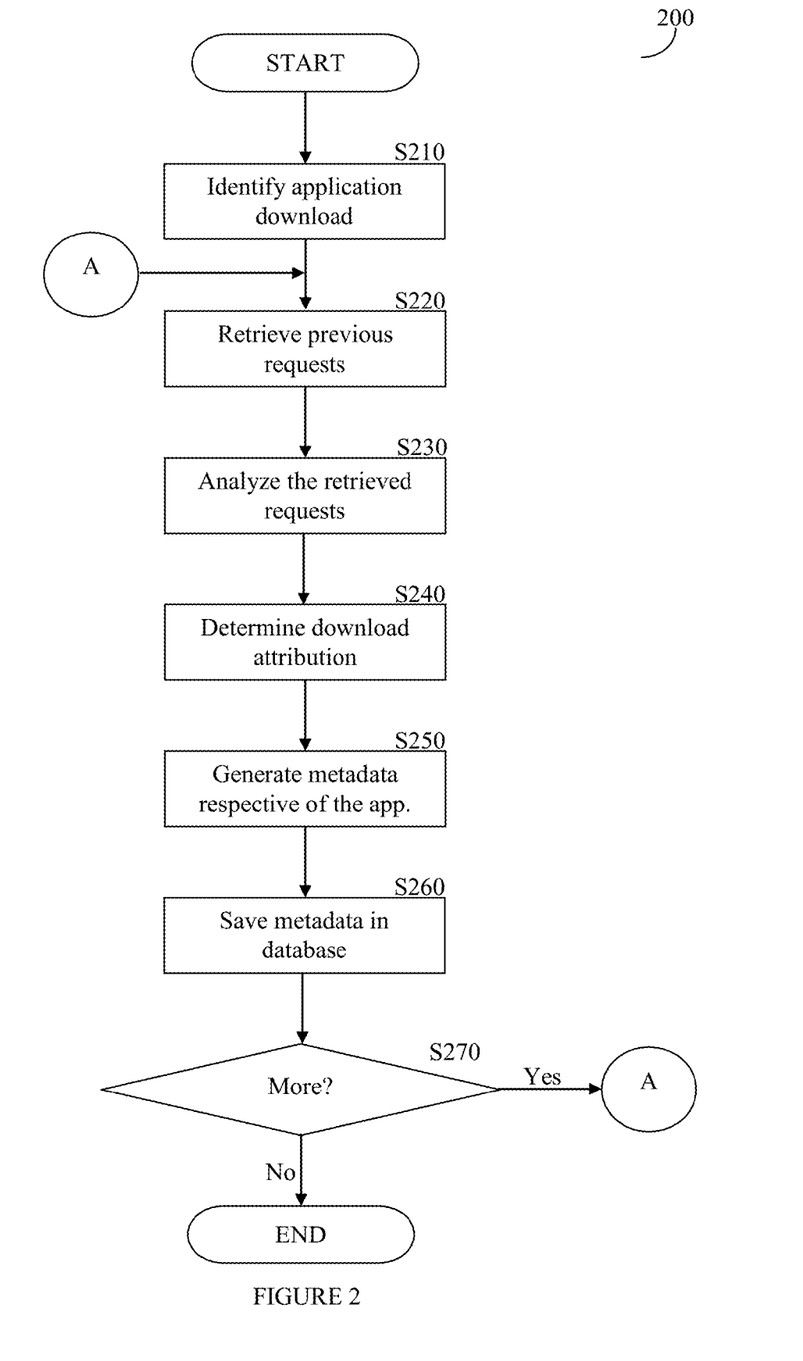
FIG. 2 is a flowchart describing a method for determining the download attribution when the connection with the central repository is unencrypted in accordance with one embodiment.

FIG. 2 shows an exemplary and non-limiting flowchart 200 describing a method for determining the download attribution in accordance with one embodiment. The method can be performed by the proxy server 140. According to this embodiment, the communication between the mobile device 110 and the application repository 130 is by means of unencrypted protocol, e.g., HTTP.

In S210, a download of an application from the application repository 130 is identified. Such an identification may be achieved by detecting a file sent to the mobile device 110 which stores an application, for example, a file with an '.ipa' extension which is an iPhone® device application, subject to a user's privacy, opt-in, or opt-out settings.

In S220, respective of the identification that an application was downloaded, previously logged HTTP requests sent from the mobile device 110 are retrieved. In S230, the retrieved requests are analyzed to identify a most recent HTTP request directed to the application repository 130 from the mobile device 110. As before, this is subject to a user's privacy, opt-in, or opt-out settings.

In S235, the identified HTTP request is further analyzed to determine at least an application identifier embedded in the request. As noted above, such a request includes, for example, at least a URL to a location in the repository of the application that was requested to be downloaded. The HTTP request may include a HTTP Referrer value indicating a webpage (such as a landing page or a web advertisement) that was the source of the download. The URL identified the HTTP request is parsed and analyzed to detect any search query included therein. In one embodiment, if the URL of the most recent HTTP request does not include a search query, a number of HTTP requests that preceded the most recent HTTP request are retrieved. The preceding requests are analyzed to detect any search queries (or key words) that led to the download of the application.

As a non-limiting example, a search for an application using a key word 'ExampleApplication' in a GooglePlay® repository would result in the following URL:
https://play.google.com/store/
search?q=ExampleApplication&c=apps
As can be noticed the key word 'ExampleApplication' is included in the URL. Selecting one of the applications available would result in the following URL:

https://play.google.com/store/apps/details?id=com.ExampleApplication.androi
d.ExampleApplicationics&feature=search_result#?t=W251bGwsMSwxLDEsl
mNvbS5vbmF2by5hbmRyb2lkLm9uYXZvaWNzll0

As can be noticed, this URL includes an identifier of the requested application.

In S240, responsive to the analysis performed in S230, the download attribution is determined. Specifically, a determination is made as to whether the application was downloaded in response to a request initiated from a web advertisement, a landing webpage, or a search query. The attribution further includes the search queries (or keywords) if such were used by the user to search for the application.

In S250, metadata respective of the downloaded application is generated in response to the analysis performed in S230 and the attribution determined in S240. The contents of the metadata include information related to at least, for example, the name, identifier, type of the downloaded application, search queries (or key words) used for searching the application, the source attributed to the download, a name of the repository from which the application was downloaded, a URL of the repository, and so on, subject to a user's privacy, opt-in, or opt-out settings.

In S260, the generated metadata is saved in a database, subject to a user's privacy, opt-in, or opt-out settings. In one embodiment, aggregated metadata can be further processed to compute statistics and actionable metrics about the downloaded applications. Examples for statistics and actionable metrics are provided above.

In S270, it is checked whether additional application downloads were identified and if so, execution returns with S220; otherwise, execution terminates.

Figure 3:
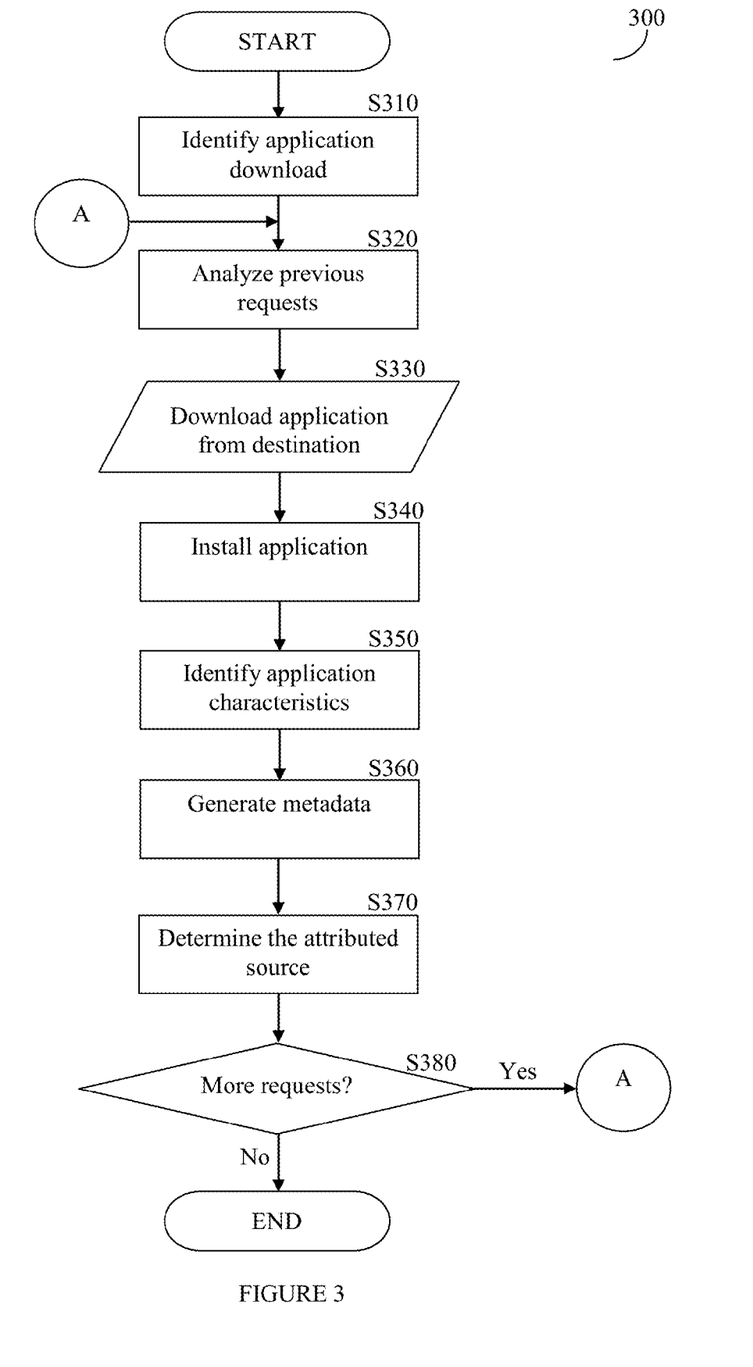
FIG. 3 is a flowchart describing a method for determining the characteristics of a downloaded application when the connection with the central repository is encrypted in accordance with one embodiment.

FIG. 3 depicts an exemplary and non-limiting flowchart 300 describing a method for determining characteristics of a downloaded application and the download attribution in accordance with another embodiment. In this particular embodiment, the method can be performed by the proxy server 140 when some of the information in the application repository 130 is encrypted using, for example, a secure sockets layer (SSL) or an encrypted communication protocol, e.g., HTTPS. As a result, the search terms input by a user of the mobile device 110, the search results received respective of the input search terms, and an application's information, are implicit to the proxy server 140. For example, in HTTPS communication the header fields including the HTTP Referer are encrypted.

In S310, a download of an application from the application repository 130 is identified by the proxy server 140. In response, in S320, previously logged requests are obtained and analyzed to identify a URL associated with a location of the downloaded application in the repository as discussed above, subject to a user's privacy, opt-in, or opt-out settings. In S330, the application is downloaded from the identified URL to the proxy server 140. The application is downloaded by the proxy server 140.

In S340, in order to generate information related to the application, the downloaded application is locally installed on the proxy server 140. In S350, respective of the installation of the application, one or more application characteristics are identified. The application characteristics may be, for example, an application name, an application bundle name, a developers' website, an icon representing the application, and so on. In S360, metadata respective of the downloaded application is generated to include at least the application identifiers determined at S350. As noted above, the metadata may be saved in the database and further processed to generate statistics and actionable metrics, subject to a user's privacy, opt-in, or opt-out settings.

In S370, the source attributed to the download of the application is determined. As noted above, the communication between the device 110 and the application repository 130 is encrypted, thus the search queries (key words) and the HTTP Referer value are also encrypted. The process of S370 is further described in FIG. 4.

In S380, it is checked whether additional application downloads are identified, and if so execution continues with S320; otherwise, execution terminates.

It should be readily appreciated that the operation of the proxy server 140 according to the embodiments described in FIG. 2 and FIG. 3 can be integrated without departing from the scope of the disclosed embodiments.

Figure 4:
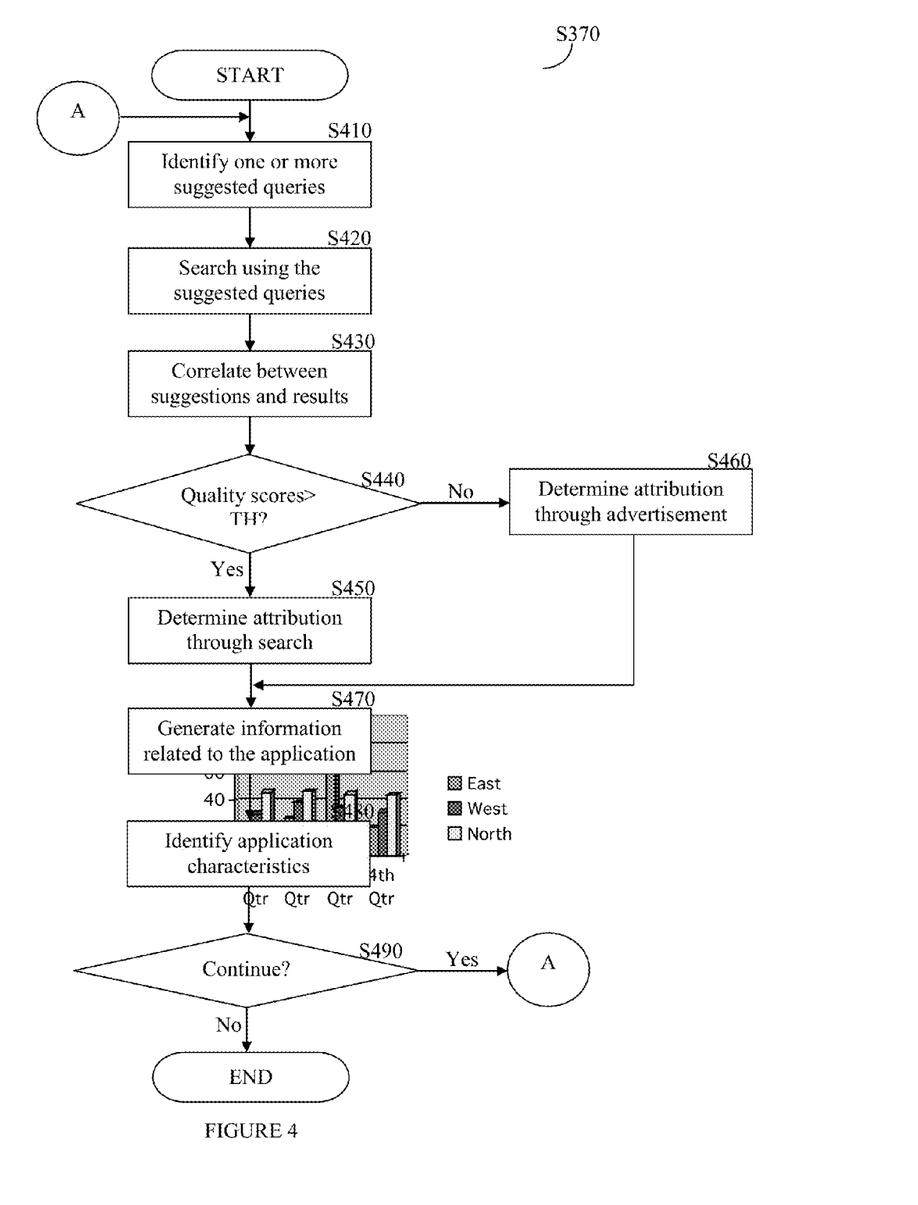
FIG. 4 is a flowchart describing a method for determining the download attribution when the connection with the central repository is encrypted in accordance with one embodiment.

FIG. 4 depicts an exemplary and non-limiting flowchart describing process performed in S370 in accordance with is embodiment. As noted above, this process can be performed by the proxy server 140.

Even through encrypted communication, an implicit search term sent to the application repository 130 is encrypted, but, one or more suggested queries returned (and displayed) in response to the implicit query are explicit and unencrypted in order to achieve a positive user experience. For example, entering the implicit search term 'ga' in a search bar interface provided by the application repository 130 would result in the explicit queries 'games', 'free games', and 'games for free'.

In S410, one or more explicit suggested queries received respective of an implicit search term are identified. With this aim, in one embodiment, the previously logged requests are analyzed to identify the explicit queries. If no explicit suggested query is detected, execution proceeds to S460.

In S420, a search for applications in the application repository 130 is performed for each of the suggested explicit queries, received respective of the implicit search term. That is, following the above example, the application repository 130 is searched for applications in 'games', 'free games', and 'games for free'. As the search results received may be encrypted, information associated with applications found through the search is explicit and unencrypted. Such information may include applications' icons, descriptions respective of the search results, and so on.

In S430, suggested queries are matched to the information associated with search results (information associated with applications found through the search), where each match receives a quality score. In S440, a check is made as to whether a minimum threshold of the quality score has been reached, and if so execution continues with S450; otherwise, execution continues with S460. The minimum threshold is a predefined value.

In S450, the download attribution is determined to be resulted from a search query, where one or more queries having a score equal to or higher than the minimum threshold are determined to be queries that led to the download of the application. In S460, the download attribution is determined to have resulted from a web advertisement or a landing webpage which provides a link to the location of the application in the repository.

In S470, the metadata generated in S360 respective of the downloaded application is updated to include the attribution information, subject to a user's privacy, opt-in, or opt-out settings. The attribution information includes, for example, search queries (or keywords) used for searching the application, the source attributed to the download, a name of the repository from which the application was downloaded, a URL of the repository, and so on. As noted above, aggregated metadata can be processed to compute statistics and actionable metrics which provide insight on the way the applications were downloaded.

In S480, one or more application characteristics are identified. In S490, it is checked whether to continue with the execution, and if so execution continues with S410; otherwise, execution terminates.

Figure 5:
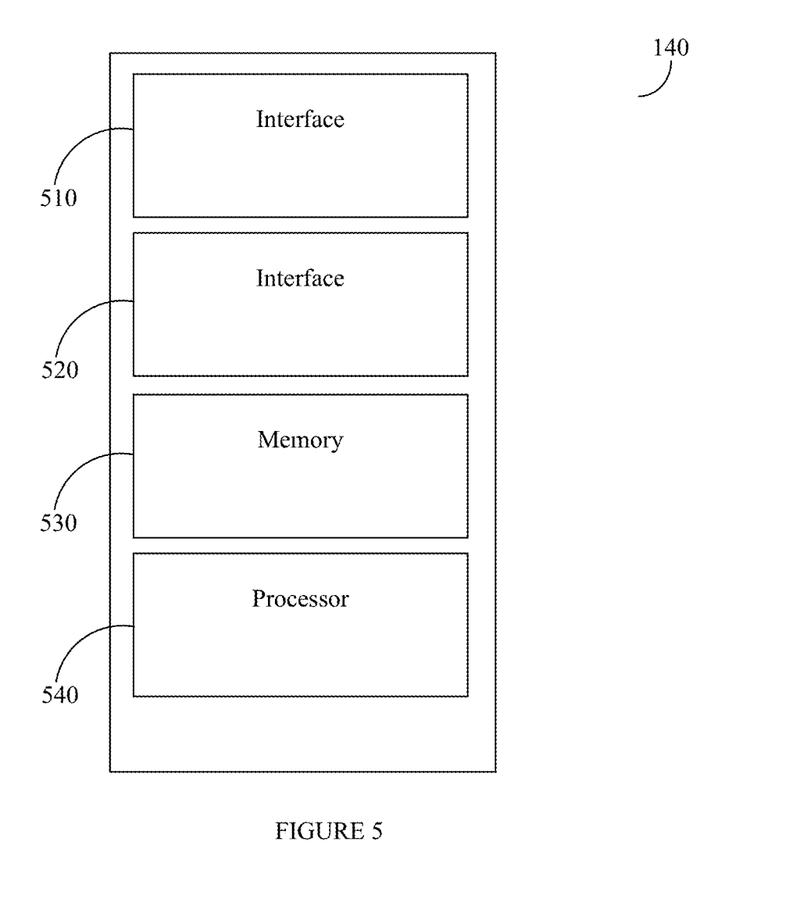
FIG. 5 is a schematic diagram of a proxy server utilized to describe various embodiments disclosed herein.

FIG. 5 depicts an exemplary and non-limiting block diagram of the proxy server 140 constructed according to one embodiment. The proxy server 140 includes a first interface 510 to the repository 130 through the network 120 and a second interface 520 to the mobile device 110. The network interfaces 510 and 520 may be integrated in a single interface.

The proxy server 140 further includes a memory unit 530 coupled to a processor 540. The memory unit 530 is configured to save logged requests and responses received at the proxy server 140. Specifically, the network interface 520 is configured to receive requests sent by the mobile device 110 and to log the requests in the memory 530, subject to a user's privacy, opt-in, or opt-out settings. In addition, the network interface 510 is configured to receive responses and files sent from the application repository 130 to the mobile device 110, subject to a user's privacy, opt-in, or opt-out settings. Such responses may be logged in the memory 530 as well, subject to a user's privacy, opt-in, or opt-out settings. The memory 530 is also configured to maintain instructions for execution by the processor 540. The processor 540 is configured to process requests and responses in order to determine the download attribution as discussed above.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining a mobile application download attribution, comprising:
   identifying, by a proxy server, an application download from an application repository to a mobile device, the proxy server configured to receive unencrypted traffic flows between the mobile device and the application repository and to identify the application download in a file sent from the application repository to the mobile device;
   analyzing, by the proxy server, previously logged requests sent from the mobile device to identify a most recent request directed to the application repository from the mobile device;
   analyzing, by the proxy server, the identified most recent request directed to the application repository to detect a source of the identified most recent request and at least one identifier of the application, the source comprising one of a web advertisement, a landing webpage, or a search query;
   determining, by the proxy server, the download attribution respective of the source that causes the application download, the download attribution determined according to whether the application download occurred in response to the identified most recent request directed to the application repository from the detected source; and
   generating, by the proxy server, an application metadata respective of the download attribution and the application identifiers.

2. The method of claim 1, wherein the application metadata includes at least one of:
   an application name, an application identifier, a type of the downloaded application, a plurality of search queries used for searching the application, a source initiated download, a name of the application repository from which the application was downloaded, and a URL of the repository.

3. The method of claim 1, further comprising: computing at least one of statistics and actionable metrics based on the determined download attribution.

4. The method of claim 1, wherein the application repository hosts a plurality of mobile applications available for download to the mobile device.

5. The method of claim 1, wherein the analyzing of previously logged requests to identify the most recent request directed to the application repository, further comprises:
   analyzing previously logged requests to identify a request that includes a uniform resource locator (URL) that points to a location in the application repository, wherein the identified request is a hypertext transfer protocol (HTTP) request.

6. The method of claim 5, wherein detecting the source that causes the application download further comprising:
   searching for at least one search term included in the HTTP request; and
   determining the source to be a search query submitted to the application repository.

7. The method of claim 5, wherein detecting the source that causes the application download further comprising:
   determining based on a HTTP Referer value included in the HTTP request the source causing the application download.

8. A non-transitory computer readable medium having stored thereon instructions for causing one or more processing units to execute the method of claim 1.

9. A method for determining a mobile application download attribution, comprising:
   identifying, by a proxy server, a download of an application from an application repository by a mobile device, the proxy server configured to receive traffic flows between the mobile device and the application repository and to identify the download of the application in a file sent from the application repository to the mobile device, wherein communication between the application repository and the mobile device is by means of an encrypted protocol;
   retrieving, by the proxy server, previously logged requests sent from the mobile device;
   analyzing, by the proxy server, the retrieved requests to identify a most recent request directed to the application repository from the mobile device;
   analyzing, by the proxy server, the most recent request directed to the application repository to determine at least an application identifier embedded in the request;
   downloading to the proxy server the application using the application identifier;
   causing installation of the downloaded application in the proxy server;
   gathering information about the downloaded application, by the proxy server, through the installation process, wherein the gathered information includes at least information characterizing the downloaded application; and
   determining, by the proxy server, a source attributed to the download of the application to the mobile device based in part on a plurality of explicit search terms identified in the previously logged requests, and according to whether the application download occurred in response to the most recent request directed to the application repository from the source comprising one of a web advertisement, a landing webpage, or a search query.

10. The method of claim 9, further comprising:
    generating an application metadata respective of the download attribution; the application identifiers; and
    computing at least one of statistics and actionable metrics based on the determined download attribution.

11. The method of claim 10, wherein the application metadata includes at least one of: an application name, an application identifier, a type of the downloaded application, a plurality of search queries used for searching the application, a source initiated download, a name of the application repository from which the application was downloaded, and a URL of the repository.

12. The method of claim 9, wherein the identifier embedded in the request is at least a URL to a location of the download application in the application repository.

13. The method of claim 9, wherein determining the source attributed to the download of the application further comprises:
    searching the application repository using the plurality of explicit search terms;
    matching each of the plurality explicit search terms to information associated with search results;
    assigning to each match a quality score;
    checking whether the quality score reaches a threshold; and
    determining the download attribution to be a search query if the quality score reaches or exceeds the threshold;
    determining the download attribution to be any one of a web advertisement and a landing page when the quality score does not reach the threshold.

14. The method of claim 13, wherein each of the explicit search queries having a quality score equal to or greater than the threshold is added to the metadata as a search query used for searching the application.

15. The method of claim 9, wherein the application repository hosts a plurality of mobile applications available for download to the mobile device.

16. A non-transitory computer readable medium having stored thereon instructions for causing one or more processing units to execute the method of claim 9.

17. A proxy server configured to determine a mobile application download attribution comprising:
  a first interface to an application repository, wherein the first interface is configured to receive responses and files sent from an application repository to a mobile device;
  a second interface to the mobile device, wherein the second interface is configured to receive requests sent by the mobile device to the application repository;
  a processor;
  a memory configured to log requests sent through the second interface, wherein the memory is connected to the processor and further configured to store a plurality of instructions that when executed by the processor configure the proxy server to:
    identify an application download from an application repository to a mobile device in a file sent from the application repository to the mobile device;
    analyze the previously logged requests sent from the mobile device to identify a most recent request directed to the application repository from the mobile device;
    analyze the identified most recent request directed to the application repository to detect a source of the identified most recent request and at least one identifier of the application, the source comprising one of a web advertisement, a landing webpage, or a search query;
    determine the download attribution respective of the source that causes the application download, the download attribution determined according to whether the application download occurred in response to the identified most recent request directed to the application repository from the detected source; and
    generate an application metadata respective of the download attribution;
  the application identifiers.

18. A proxy server configured to determine a mobile application download attribution comprising:
  a first interface to an application repository, wherein the first interface is configured to receive responses and files sent from the application repository to a mobile device;
  a second interface to the mobile device, wherein the second interface is configured to receive requests sent by the mobile device to the application repository;
  a processor;
  a memory configured to log requests sent through the second interface, wherein the memory is connected to the processor and further configured to store a plurality of instructions that when executed by the processor configure the proxy server to:
    identify a download of an application from the application repository to the mobile device in a file sent from the application repository to the mobile device, wherein communication between the application repository and the mobile device is by means of an encrypted protocol;
    retrieve previously logged requests sent from the mobile device;
    analyze the retrieved requests to identify a most recent request directed to the application repository from the mobile device;
    analyze the most recent request directed to the application repository to determine at least an application identifier embedded in the request;
    download to a proxy server the application using the application identifier;
  cause installation of the downloaded application in the proxy server;
    gather information about the downloaded application through the installation, wherein the gathered information includes at least information characterizing the downloaded application; and
    determine a source attributed to the download of the application to the mobile device based in part on a plurality of explicit search terms identified in the previously logged requests, and according to whether the application download occurred in response to the most recent request directed to the application repository from the source comprising one of a web advertisement, a landing webpage, or a search query.

* * * * *